United States Patent [19]

Bauer et al.

[11] Patent Number: 4,893,011

[45] Date of Patent: Jan. 9, 1990

[54] METHOD OF PROCESSING X-RAY FILM CASSETTES WITH PHOSPORUS-COATED FILMS AND A READING STATION FOR EXECUTING THE PROCESS

[75] Inventors: Walter Bauer; Jürgen Müller, both of Munich; Volkmar Voigtländer, Eichenau, all of Fed. Rep. of Germany

[73] Assignee: Agfa-Gevaert AG, Leverkusen, Fed. Rep. of Germany

[21] Appl. No.: 238,034

[22] Filed: Aug. 29, 1988

[30] Foreign Application Priority Data

Sep. 17, 1987 [DE] Fed. Rep. of Germany ....... 3731203

[51] Int. Cl.4 .......................... G03G 5/16; H05B 33/00; B65B 21/02; B65B 69/00
[52] U.S. Cl. ............................... 250/327.2; 250/424.1; 414/403
[58] Field of Search .......................... 250/327.2, 484.1; 414/403; 378/162, 165

[56] References Cited

U.S. PATENT DOCUMENTS

| 4,498,005 | 2/1985 | Oono et al. | 250/327.2 |
| 4,514,958 | 5/1985 | Hoorn | 414/403 X |
| 4,523,420 | 6/1985 | Kayser et al. | 414/403 X |
| 4,636,641 | 1/1987 | Mori et al. | 250/327.2 |
| 4,681,227 | 7/1987 | Tamura et al. | 250/484.1 X |
| 4,739,480 | 4/1988 | Oono et al. | 378/165 X |
| 4,768,099 | 8/1988 | Mukai | 358/403 |
| 4,787,521 | 11/1988 | Utsumi et al. | 250/327.2 X |
| 4,799,591 | 1/1989 | Tajima et al. | 378/182 X |
| 4,810,874 | 3/1989 | Torii | 250/327.2 |

FOREIGN PATENT DOCUMENTS 0142709 5/1985
0079557 4/1986
3544719 3/1989 Fed. Rep. of Germany .

Primary Examiner—Constantine Hannaher
Assistant Examiner—J. Eisenberg
Attorney, Agent, or Firm—Michael J. Striker

[57] ABSTRACT

A method and a reading station for processing a cassette containing an X-ray film coated with a layer of stimulatable phosphorus are proposed. The cassette with the film therein, before being positioned in the reading station, is exposed to X-rays to produce a latent image thereon. The film is then removed from the cassette and the phosphorus layer is brought by a laser beam scanner to luminescence so that the emitted light converts the latent image into digital electric signals stored in the central memory. The film is then erased and re-inserted into the same cassette within the reading station.

10 Claims, 5 Drawing Sheets

METHOD OF PROCESSING X-RAY FILM CASSETTES WITH PHOSPORUS-COATED FILMS AND A READING STATION FOR EXECUTING THE PROCESS

BACKGROUND OF THE INVENTION

The present invention relates to a method of processing a cassette containing an X-ray film coated with a layer of stimulatable phosphorus.

Cassettes processed in the method of the invention are normally comprised of two parts pivotally connected relative to each other, namely a bottom portion accommodating a film and a lid. The layer side of the X-ray film faces the bottom of the cassette whereby when the film is exposed to X-rays a latent image produced in the reading station, after the film has been removed from the cassette, by a laser beam scanner is brought to luminescence and the emanated light would convert the latent image into digital electric image signals. Then the film is erased by exposure to visible light while digital signals are stored in a central memory and are converted into a visible image on the image screen and/or the screen image in the image screen receiving apparatus, or the digital image signals are received in the laser beam receiving apparatus controlled by the central memory (both devices are known as hardcopy devices) on a photographic sheet film.

The invention also relates to a reading station for carrying out the process of the invention.

A cassette processed in accordance with the inventive method has been disclosed, for example in EP 0,079,557 B1. A method for using such a cassette has been disclosed, for example, in EP 0,142,709 A2. Devices for carrying out the known method are available on the market. The method for processing such cassettes for accommodating films coated with a layer of phosphorus is based on the principle that the illumination of the film positioned in the cassette with X-rays results in a latent image. After the removal of the film from the cassette in the reading station, the latent image by means of the laser beam scanner becomes luminescent (phosphorus is stimulated) and the emitted light converts the image into digital electric signals indicative of that image. These signals are then again converted into a visible image on the screen or processed in a computer-controlled laser beam receiving apparatus into an image visible on the screen of that apparatus. The latent or stimulated image is then erased from the film and the film is transported into a cassette-loading device. Identification data must be provided on the film, which data can be easily read-out in a specific reading device. These data should be converted into electric identification signals and added to aforedescribed digital image signals.

The disadvantage of the known method resides in that the film, between its removal from the cassette in the reading station and its re-insertion into the cassette in the cassette loading device, is not protected against mechanical influences which can cause a premature wear-off of the phosphorus layer.

SUMMARY OF THE INVENTION

It is an object of the present invention to provide an improved method of processing cassettes and films accommodated therein.

It is another object of the invention to provide a quick and reliable method of handling X-ray film cassettes.

Yet another object of the invention is to provide an improved reading station for executing the method of this invention.

These and other objects of the invention are attained by a method of processing an X-ray film cassette formed of a bottom part and a lid pivotable one relative to another and containing an X-ray receiving film coated with a layer of stimulatable phosphorus which faces towards said bottom part, the method comprising the steps of exposing said film to X-rays to produce thereon a latent image and in a reading station, after removing the film from the cassette, bringing said latent image to luminescence by means of a laser beam scanner so that emitted light converts said image into digital electric image signals, erasing said film by exposing the same to visible light, storing the digital image signals in a central memory and converting them into a visible image on an image screen or in an image screen receiving apparatus or processing the digital image signals stored in the central memory in a laser beam receiving apparatus to receive them on a photographic sheet film, positioning the cassette in the reading station, removing the film from the cassette and inserting the film into a film platform, guiding said film platform with the film therein in a direction perpendicularly to a scanning direction of a laser beam scanner which scans the film, guiding said film platform further to a light-conductive element which is connected to a photomultiplier and the central memory in which said storing step is executed, moving said platform with the film further to a lamp to execute said erasing step, said platform being guided linearly from an initial position to an end position, transporting said cassette in the same direction as said platform with the film to a position corresponding to said end position, inserting the film removed from the platform into said cassette at said corresponding position, closing the lid of said cassette and discharging said cassette with the erased film therein from the reading station for a reuse.

If the method is applied to a cassette in which a memory carrying storable, recordable, readable and erasable data in digital form is provided on the lid of the cassette of all customary formats or a cassette having a window for a memory connected with a non-coated side of the film, the method may comprise the steps of providing an identification station having a memory, inputting into said memory of the identification station specific image data, reading-out the memory of said cassette by a reading device when said cassette is positioned in said reading station, opening said lid of the cassette if it is determined after said reading-out that a correct cassette is positioned in said reading station before said removing step, storing a signal indicative of a reading-out output of said reading device together with digital image signals in the central memory, whereby in case of an insertion of an incorrect cassette into the reading station said reading-out output will be false and the cassette will not be opened and will be discharged from the reading station with the closed lid.

The objects of the invention are also attained by a reading station for processing an X-ray film cassette formed of a bottom part and a lid pivotable one relative to another and containing an X-ray receiving film coated with a layer of stimulatable phosphorus which faces towards said bottom part, wherein said film is exposed to X-rays to produce thereon a latent image, the reading station comprising housing means having an inlet opening for insertion the cassette with the film therein into the reading station and an outlet opening aligned with said inlet opening and formed opposite thereto for discharging the cassette from the reading station; two cassette positioning means for positioning the cassette in said reading station, a first one of said positioning means being located next to said inlet opening and a second one of said positioning means being located next to and before said outlet opening and in alignment with said first positioning means; means for removing the film from the cassette, a laser beam scanner for bringing said latent image to luminescence so that emitted light converts said image into digital electric signals; a central memory for storing said digital image signals; means for erasing said film by exposing the same to visible light; a film platform receiving the film removed from the cassette, said first and second positioning means guiding said film platform with the film therein in a direction perpendicularly to a scanning direction of the laser beam scanner which scans the film; a light-conductive element and a photomultiplier connected to the central memory, said erasing means including a lamp, said positioning means linearly moving said platform with the film by said light-conductive element and said lamp from an initial position to an end position, said positioning means including means transporting said cassette in the same direction as said platform with the film to a position corresponding to said end position; means inserting the film removed from the platform into said cassette at said corresponding position; and means closing the lid of said cassette, said cassette with the erased film therein being discharged from the reading station through said outlet opening.

The cassette transporting means of each positioning means may include a flat guiding track provided with at least one friction roller, said positioning means further including two guiding skids aligned with each other and positioned between two flat guiding tracks of said cassette transporting means, two cassette transporting tapes extending above said skids, said opening means, removing means, inserting means and closing means being positioned below each of said guiding skids, means to move each guiding skid up and down so that the cassette is engaged with and disengaged from said opening means, said removing means, said inserting means and said closing means.

The positioning means may each include a supporting plate to support the bottom part of the cassette, said supporting plate supporting said transporting tape and being positioned above a respective guiding skid.

Each guiding skid may include at least two lifting prongs engaging the cassette for transmitting the same to and lifting the same from said opening means, said removing means, said inserting means and said closing means, said prongs being spaced from each other by a distance which is smaller than a length of the smallest cassette processed in the reading station.

The positioning means move said film platform below said opening means, said removing means, said inserting means and said closing means between an initial position and an end position, said film removing means and film inserting means including at least one sucker which removes the film from the cassette in its initial position and inserts the erased film back into the cassette in its end position.

The reading station may further include an electronic control device and drive means for said positioning means, said guiding skids, said opening means, said removing means, said inserting means and said closing means, said drive means being connected to and controlled by said control device so that a correct and timely succession of function of said means be ensured.

If the cassette including a digital memory or on the film of which is provided digital memory is employed, a reading device is provided for reading out the memory on the cassette or on the film, said reading device being pivotable and being connected to said central memory and controllable by said control device and being pivotable to be positioned against said memory on the cassette or the film and back to an initial position after reading-out data on said memory.

Said opening means, said removing means, said inserting means and said closing means may be formed as two similar groups of structural components, each group being assigned to a respective guiding skid and a respective transporting tape for the film removal from and the film insertion into said cassette.

The method and the reading station according to the invention have the following advantages:

1. A user has no contact with a film except when the film should be exchanged after a long-time use.
2. A specific cassette loading process as well as cassette-loading apparatus are omitted.
3. One can always determine that the cassette is filled with a film.
4. The cassette is entirely closed and should have no window for reading-out data on the film.
5. The film and the cassette are accompanied with a changeable data set over their entire service life. This offers the possibility that the changing of the cassette and film can be recognized from the number of exposures and condition "exposed/erased". The setting of the counting by "one" in the cassette memory with each digital conversion of the latent image can be carried out in the reading station by a reading device for the cassette memory which is reset to zero in the identification station when the film is interchanged. For storing the film condition "exposed/erased" in the cassette memory, a data input device should be provided in the X-ray apparatus and a respective erasing arrangement should be provided in the reading device. Upon reading the number indicative of the service life of the cassette, a warning signal may be released either in the reading station or identification station.
6. Patient data can be input in the cassette before or during the X-ray examination and added to image informations registered by the phosphorus-coated film.
7. Due to the re-insertion of the film into the same cassette, the film should be outside of the cassette over an extremely short path whereby the film is much better protected against damage and wear during its transportation, as compared to the conditions of conventional methods of processing of X-ray film cassettes with phosphorus-coated films. This method is particularly advantageous when patient data are stored not in the memory of the cassette but are supplemented in another manner to digital image signals, for example by a readable memory on the film or bu direct data signals added to the image signals by the keyboard in the reading station.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
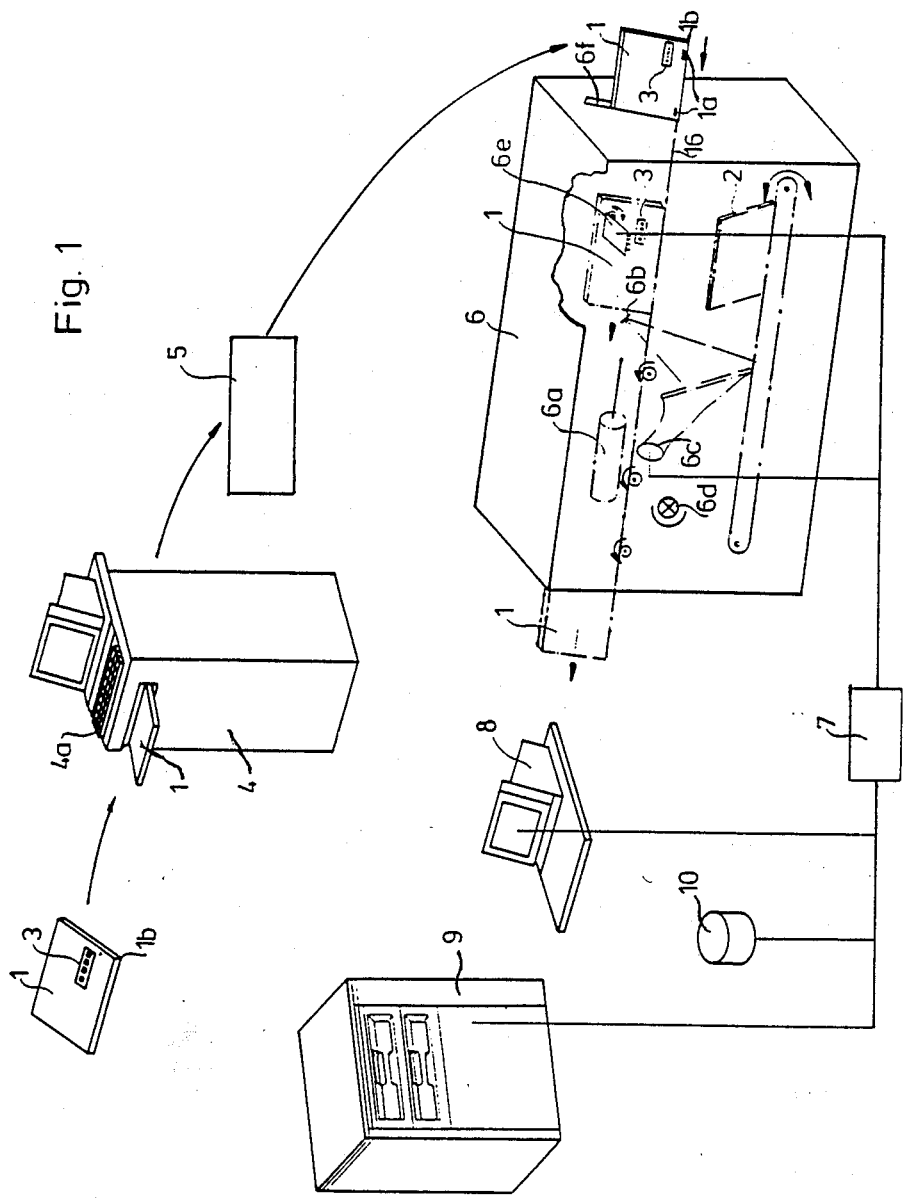
FIG. 1 is a combined schematic view of the devices for executing a method according to the invention.

The present invention is suitable for a known cassette for accommodating X-ray sensitive photographic materials. Such cassettes are comprised of two housing portions pivotable relative to each other. One of such portions is a bottom part and another is a lid, whereby normally the bottom part faces a patient or X-rays. The pressing means for the photographic material, for example a foam plate is accommodated in the cassette. The cassettes being processed are identified in the drawings by reference numeral 1 and are shown only schematically. Cassettes 1 of substantially the same suitable type with elements 1a for locking and unlocking the lid are available in different sizes and formats. Instead of a usual photographic X-ray film, can be accommodated in cassette 1 a film or foil 2 which is coated with a stimulatable phosphorus layer. When this film with the phosphorus layer is subjected to X-rays a latent image is produced which, by scanning with a laser beam becomes luminescent and is converted into digital electric image signals which are stored. The stored image signals can then be observed as a visible image on the screen. Also a so-called hardcopy on the usual photographic film can be produced by the known method.

On the external surface of the lid of each cassette 1, in a determined position relative to a reference point, which is the same for all cassettes of the same type but different formats, is positioned a memory 3 for storable, recordable, readable and erasable data, which processes said data in digital form and is attached to the lid. This memory will be identified as a cassette memory. Only a carrier plate and terminals 3a and 3d of the memory 3 are shown. As a reference point for the position of memory 3, can be taken a predetermined corner 1b of the cassette, according to which the cassettes of all formats are positioned in cassette processing apparatus.

Either a magnetic memory (magnetic strips) or a semiconductor memory can be utilized for cassette memory 3. The advantage of magnetic strips is that they are simple and non-expensive. Their disadvantage is that they can store only small amounts of data and the reading-out process is quite time-consuming. Therefore, the superconductor memory is more advantageous. Its advantages reside in a quick readability, high storage capacity, non-sensitivity to magnetic fields and relatively small reading mechanics. The connection between the data memory and the reading-out electronics can be carried out galvanically or wireless. In case of using galvanic contacts a series memory with a small number of terminals can be provided.

The utilization of the aforedescribed cassette with the phosphorus-coated film or foil 2 and a recording and at least partially erasable memory 3 rigidly connected to the flat side of the cassette requires a specific process of handling such a cassette. The first principle of handling phosphorus-coated films 2 is that during the exposure of the film to X-rays in an X-ray apparatus 5 a latent image is produced, which in the reading station 6, after the removal of the film 2 from the cassette 1, is by means of a laser beam scanner 6a, stimulated, via a rotating mirror 6b, preferably upon a further movement of film 2, to phosphorescence and the so-produced light converts the image via the fibrous optics and a photomultiplier 6c into digital electric image signals. Then the image on the film 2 is erased by the exposure to visible light by means of a lamp 6d. Digital image signals are stored in a central memory 7 and can be converted again into the visible image on screen 8 or received on an image screen receiving apparatus or a laser beam receiving apparatus 9 (both apparatuses are known as hardcopy devices), on a photographic sheet material in form of the visible image. These signals can also be stored in a disc 19 or the like equipment.

The new principle of the method of processing such a cassette resides in that in an identification station 4 provided with an operation keyboard 4a, data are stored from a cassette memory 3 which storage image specific data, for example, patient data, and either immediately before or after the X-ray reception in the X-ray apparatus 5, the stored data of memory 3 are read out in the reading station 6 and are stored, together with the digital image signals obtained from the film 2 exposed to X-rays, in the central memory 7 and are photographed together with a respective image visible on screen 8 or in the hardcopy apparatus 9. The erasing of the specific image data from the cassette memory 3 after their evaluation in the reading station 6 can be executed either in a reading arrangement 6e or when new data are input in memory 3 in the identification station 4. The method versions depend upon the devices utilized.

Figure 2:
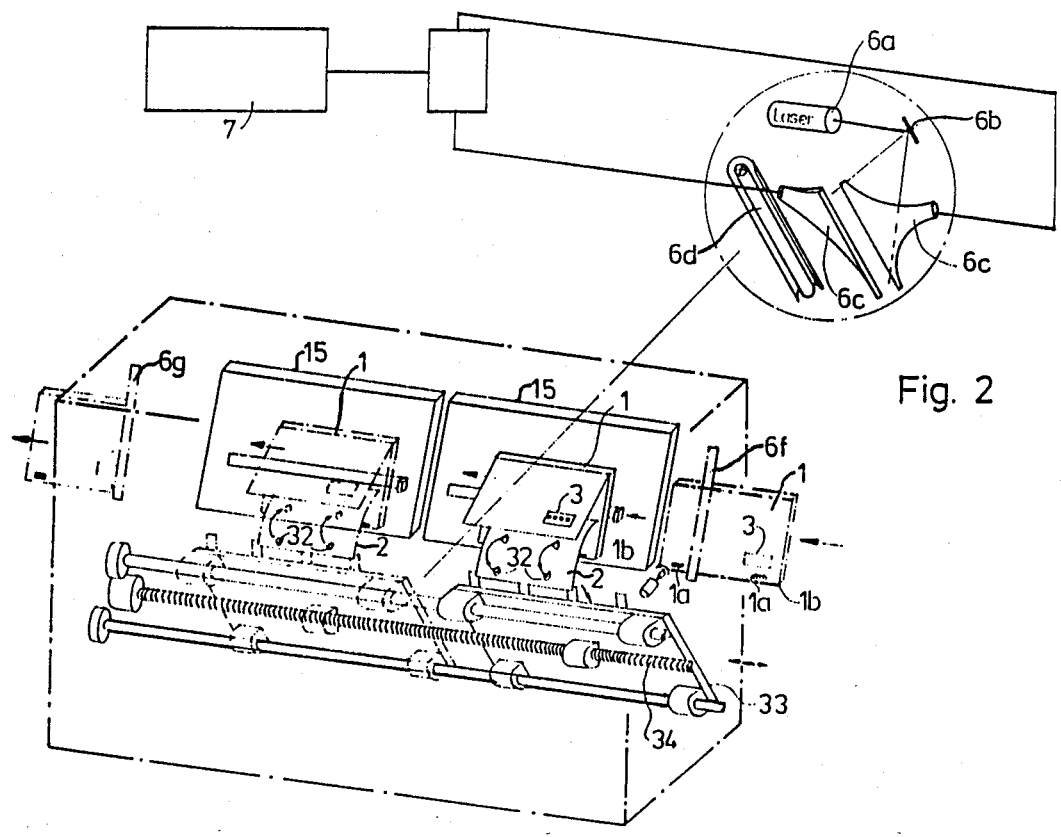
FIG. 2 is a schematic and partially perspective view of the reading station for carrying out the method of the invention.

For processing cassettes 1 carrying films 2 with memories 3, cassette 1 provided with stored specific image data is inserted into the reading station 6 through an insertion slot 6f as shown by arrows in FIGS. 1 and 2. The cassette 1 is positioned in the reading station. The specific image data are read-out from memory 3 by the reading arrangement 6e; then the cassette 1 is opened and film 2, after the aforedescribed conversion of its latent image into digital image signals and the storing of those signals and the data from memory 3 in the central memory 7 and erasing the image from the film 2, is again transported into the same cassette 1 from which this film was removed. Then a reloaded cassette is removed from the outlet slot 6g (FIG. 2).

Figure 4:
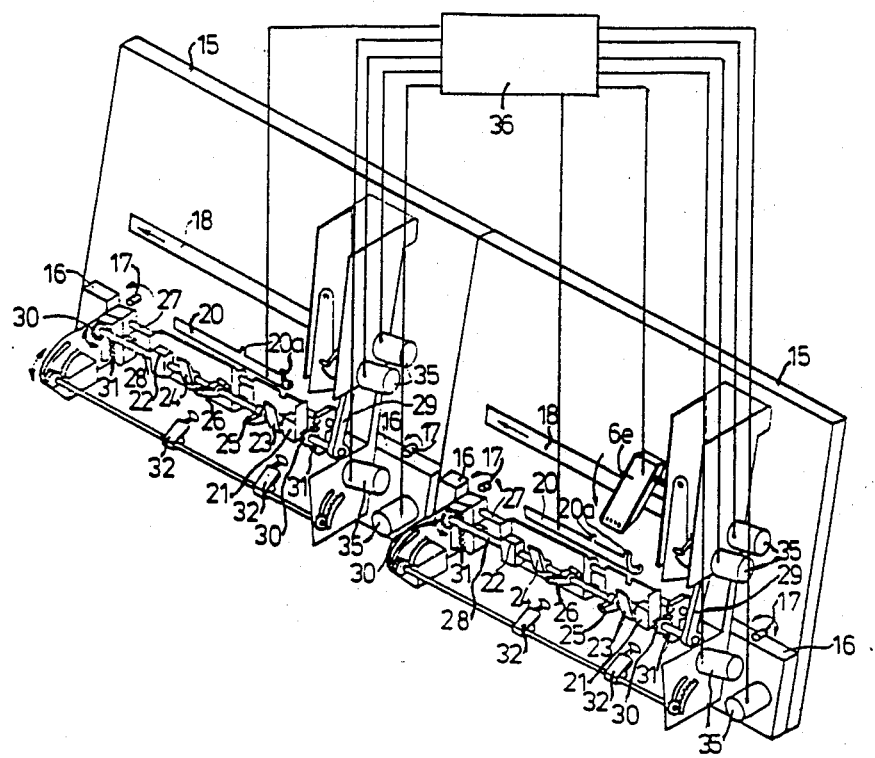
FIG. 4 is a perspective view of the parts of the reading station which serve to transport the cassette and load and unload the same.
Figure 3:
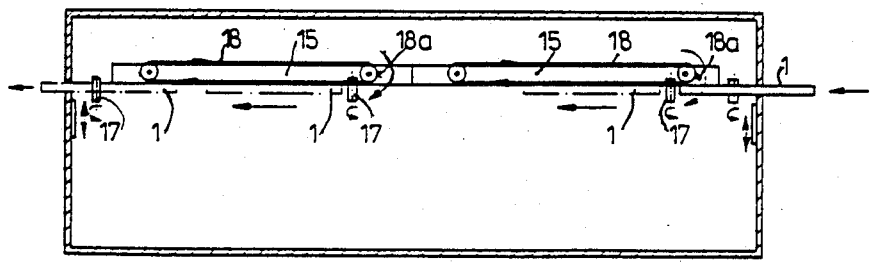
FIG. 3 is a schematic plan view of the cassette-transporting device which is a part of the reading station.

The characteristic of this method is, as shown in FIGS. 2 to 4, that the cassette 1 inserted into the reading station 6 is transported substantially linearly through the reading station 6. At the first location, the cassette is supported and lowered so that it is gripped by a known positioning and unloading device, opened, unloaded and closed. Then the cassette is lifted to its previous level on the transporting track and is displaced to a second location or position in which the cassette is again handled by the second positioning and loading device similar to the aforementioned one. In this second positioning and loading device, the cassette 1 is again positioned, opened and reloaded with a processed film 2, as described above, then closed and discharged for reuse through the outlet slot 6g from the reading station 6. The film 2 removed from the cassette 1 in the first positioning and unloading device is inserted in the known fashion into a conventional flat film platform and is moved in this platform linearly and parallel to the cassette 1 through its processing station and then is inserted back into the cassette 1 in the second positioning and loading station. Film 2 outside of the cassette is moved back only over a very short path parallel to the cassette movement, whereby a separate delivery of the cassette and the film in the loading apparatus is omitted, and the film can be saved from abrasion. In addition, the time on loading can be saved and a specific loading apparatus can be dispensed with.

Figure 5:
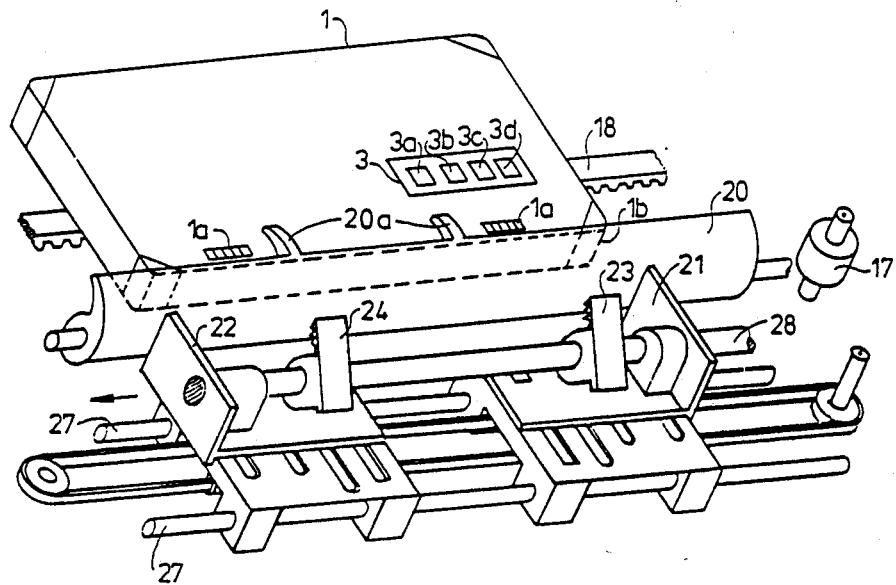
FIG. 5 is a perspective view, on an enlarged scale, of the parts of FIG. 4 before the cassette unloading or re-loading.
Figure 6:
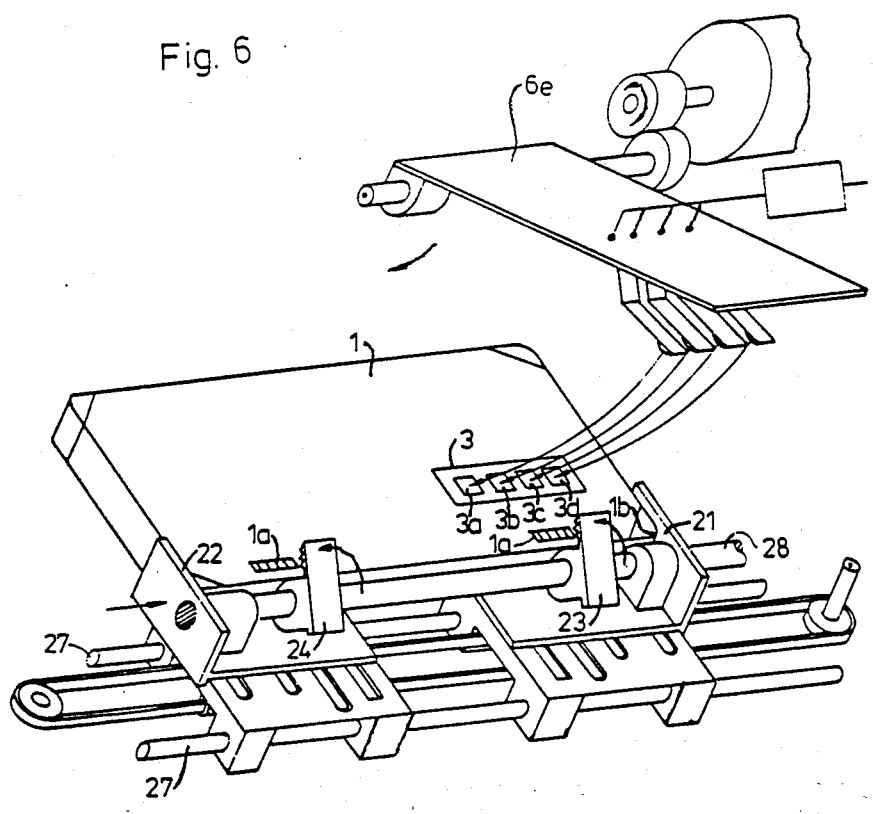
FIG. 6 is a perspective view, on an enlarged scale of the parts of FIG. 4 in the position in which the cassette is positioned before being unloaded.

The positioning of the cassette for reading-out its memory 3 and for the removal of the exposed film and reinsertion of the same into the cassette in the reading station 6, shown in detail in FIGS. 2 to 4, can be executed by known cassette-loading-and-unloading devices, disclosed for example in the German document DE 3,544,719 C1. Two such devices which are similar to each other and serve to position, load and unload the cassette received in the reading station 6 are schematically shown in FIG. 4. Each of these devices includes a supporting and guiding plate 15 each positioned laterally behind the respective inlet or outlet slot 6f, 6g. In alignment with the lower edge of each of the slots 6g, 6f are positioned guiding tracks 16 for cassette 1. Each guiding track 16 is provided with at least one driven friction roller 17. If the cassette 1 is inserted into the reading station through inlet slot 6f and is moved up to the friction roller 17 of the firs positioning and unloading device this roller grips the cassette and moves the same to the transporting belt 18 with grippers 18a of which only one is shown. Now the transporting belt 18 transports the cassette to the positioning device. When the leading edge of the cassette has reached a non-shown light barrier or the like switch the transporting belt and the cassette thereon are stopped. Then the cassette is transferred to pivotable guiding skids 20 in the region of the positioning means. The latter are each comprised of an abutment angle 21 which is stationary and an abutment angle 22 which is movable and is aligned with abutment angle 21. Rotatable and movable holding bars 22, 24 for unlocking the cassette lid by teeth provided on the lower faces thereof (FIGS. 5, 6) and rotatable levers 25, 26 for closing the cassette lid are positioned between the abutment angles 21 and 22. The abutment angle 22 along with the holding bar 24 and lever 26 assigned thereto is displaceable on a rod 27 and, together with holding bar 23 and lever 24 is supported on a shaft 28, which is rotated by a crank drive 29 rigidly connected to shaft 28 and, by gears 30 rigidly connected to the crank drive 29 and meshing with a toothed rack 31, is displaced up and down. Upon the insertion of the cassette into the reading station 6, shaft 28 is in its upper position in which abutment angles 21, 22 not rotated by shaft 28 lie approximately in or below the plane of track 16 or guiding skid 20. The cassette is also moved by the guiding skid 20 from the plane of track 16 to the region of the abutment angles 21, 22. Then the movable angle 22 is displaced relative to the stationary angle 21 so that the cassette is positioned between these angles. Now, the reading arrangement 6e which lies against the cassette lid is pivoted in front of the cassette memory 3 to read-out the data stored therein and transmits those data to the central memory 7 as described above. The reading arrangement 6e thereafter is pivoted away from the memory 3. Crank 29 now rotates shaft 28 in the counterclockwise direction. A this point, the cassette, bars 23, 24 and levers 25, 26, as shown in FIGS. 5 and 6, are moved by control cams downwardly, and at this time, holding bars 23, 24 and levers 25, 26 are rotated and also displaced so that the cassette locking means 1a are unlocked, and the cassette lid springs out from the bottom of the cassette either under the action of the cassette spring or is pulled from the bottom of the cassette by a non-shown opening hook pivotably supported on the crank 29. The film 2 is sucked out from the cassette 1 by known suckers 32 and is inserted into the conventional film platform 33 (FIG. 2), for example, by vacuum means, and further transported to the laser beam scanner 6a. After the erasing of the film 2, it is transported to the region of suckers 32 of the second positioning device for cassette 1 and is inserted back into the cassette. The cassette has been already moved to this point by two transporting belts 18 connected to each other, after it has been closed in the first positioning device and lifted by the first guiding skid 20 to the plane of track 16. When the cassette 1 has reached the second positioning device it is again supported and inserted by second guiding skid 20 into the second positioning device, positioned there and opened. Now, crank 29 rotates in the opposite direction; cassette 1 and shaft 28 are moved upwards, and levers 25, 26 grip the cassette lid and push it to close. The re-loaded and closed cassette is pivoted upwardly by the guiding skid 20 onto the plane of track 16, and by means of the second transporting belt 18 and its grippers 18a and, also the friction rollers 17, is moved through the slot 6g from the reading station 6.

The movement of platform 33 (FIG. 2) can be executed by such known means as a moor-driven worm 34 or a belt drive. The swinging motion of the reading device 6e towards the cassette memory 3 in the first positioning device (FIG. 6) is carried out be a motor drive. The guiding skid 20 is clearly depicted in FIG. 5. Both guiding skids 20 are driven by a motor in a non-shown fashion. Each guiding skid 20 includes two prongs 20a which engage the lower narrower side of the cassette and hold it during the pivoting downwardly into the positioning device up to the final transfer and become again disengaged from the cassette. Individual drive motors 35 for the positioning devices are schematically shown in FIG. 4.

Control of the drives of all individual devices of the reading station 6 is executed in the known mode by an electronic control device 36 schematically illustrated in FIG. 4. This control is formed such that if an incorrect cassette is inserted or an incorrect cassette is recognized by the reading device 6e which reads out the cassette memory 3 this is registered on the electronic control device 36. If an incorrect or non-processed cassette is placed at the positioning device the cassette memory 3 would not appear under the reading station 6e. The reading device then would not be able to read-out the information and this would be reported not only in the central memory 7 but also in the control device 36. The latter would stop the normal process and initiate discharging of the non-usable cassette from the reading station. The cassette would not be open, but be lifted by the first guiding skid 20 to the plane of track 16 and moved to the outlet slot 6f by the movement of belt or tape 18 and friction rollers 17. The user therefore would be aware that the cassette is not in order.

A further modification of the method and device according to the invention is that a changeable data set would be provided in the cassette memory 3 or in one of the respective memories on the film which is freely accessible through a window in the cassette. The data of such data, for example upon each cooperation with the reading device 6e would be increased by one and the data set would be reset to zero only with the exchange of the film. In this way it would be determined as to how many times the film can be re-used. When the number of exposures is higher than that allowed for the service life of the film an alarm signal will be released for the system of devices 4, 5 and/or 6.

The reading station according to the invention has the advantage that two similar structural units can be employed for positioning, unloading and re-loading of the cassette, whereby manufacture and assembly are substantially facilitated.

It will be understood that each of the elements described above, or two or more together, may also find a useful application in other types of methods and devices for processing X-ray film cassettes, differing from the types described above.

While the invention has been illustrated and described as embodied in a method and a device for processing X-ray film cassettes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. In a method of processing an X-ray film cassette formed of a bottom part and a lid pivotable one relative to another and containing an X-ray receiving film coated with a layer of stimulatable phosphorus which faces towards said bottom part, the method comprising the steps of exposing said film to X-rays to produce thereon a latent image and in a reading station, after removing the film from the cassette, bringing said latent image to luminescence by means of a laser beam scanner so that emitted light converts said image into digital electric image signals, erasing said film by exposing the same to visible light, storing the digital image signals in a central memory and converting them into a visible image on an image screen or in an image screen receiving apparatus or processing the digital image signals stored in the central memory in a laser beam receiving apparatus to receive them on a photographic sheet film, the improvement comprising positioning the cassette in the reading station, removing the film from the cassette and inserting the film into a film platform, guiding said film platform with the film therein in a direction perpendicularly to a scanning direction of a laser beam scanner (6a, 6b) which scans the film, guiding said film platform further to a light-conductive element (6c) which is connected to a photomultiplier and the central memory in which said storing step is executed, moving said platform with the film further to a lamp to execute said erasing step, said platform being guided linearly from an initial position to an end position, transporting said cassette in the same direction as said platform with the film to a position corresponding to said end position, inserting the film removed from the platform into said cassette at said corresponding position, closing the lid of said cassette, and discharging said cassette with the erased film therein from the reading station for a reuse.

2. The method as defined in claim 1, for processing a cassette in which a memory carrying storable, recordable, readable and erasable data in digital form is provided on the lid of the cassette of all customary formats or a cassette having a window for a memory connected with a non-coated side of the film, the method comprising the steps of providing an identification station having a memory, inputting into said memory of the identification station specific image data, reading-out the memory of said cassette by a reading device when said cassette is positioned in said reading station, opening aid lid of the cassette if it is determined after said reading-out that a correct cassette is positioned in said reading station before said removing step, storing a signal indicative of a reading-out output of said reading device together with digital image signals in the central memory, whereby in case of an insertion of an incorrect cassette into the reading station said reading-out output will be false and the cassette will not be opened and will be discharged from the reading station with the closed lid.

3. A reading station for processing an X-ray film cassette formed of a bottom part and a lid pivotable one relative to another and containing an X-ray receiving film coated with a layer of stimulatable phosphorus which faces towards said bottom part, wherein said film is exposed to X-rays to produce thereon a latent image, the reading station comprising housing means having an inlet opening for insertion the cassette with the film therein into the reading station and an outlet opening aligned with said inlet opening and formed opposite thereto for discharging the cassette from the reading station; two cassette positioning means for positioning the cassette in said reading station, a first one of said positioning means being located next to said inlet opening and a second one of said positioning means being located next to and before said outlet opening and in alignment with said first positioning means; means for removing the film from the cassette, a laser beam scanner for bringing said latent image to luminescence so that emitted light converts said image into digital electric signals; a central memory for storing said digital image signals; means for erasing said film by exposing the same to visible light; a film platform receiving the film removed from the cassette, said first and second positioning means guiding said film platform with the film therein in a direction perpendicularly to a scanning direction of the laser beam scanner (6a, 6b) which scans the film; a light-conductive element (6c) and a photomultiplier connected to the central memory, said erasing means including a lamp, said positioning means linearly moving said platform with the film by said light-conductive element and said lamp from an initial position to an end position, said positioning means including means transporting said cassette in the same direction as said platform with the film to a position corresponding to said end position; means inserting the film removed from the platform into said cassette at said corresponding position; and means closing the lid of said cassette, said cassette with the erased film therein being discharged from the reading station through said outlet opening.

4. The reading station as defined in claim 3, said cassette transporting means of each positioning means including a flat guiding track (16) provided with at least one friction roller (17), said positioning means further including two guiding skids (20) aligned with each other and positioned between two flat guiding tracks of said cassette transporting means, two cassette transporting tapes (18) extending above said skids, said opening means, removing means, inserting means and closing means being positioned below each of said guiding skids, means to move each guiding skid up and down so that the cassette is engaged with and disengaged from said opening means, said removing means, said inserting means and said closing means.

5. The reading station as defined in claim 4, said positioning means each including a supporting plate to support the bottom part of the cassette, said supporting plate supporting said transporting tape and being positioned above a respective guiding skid.

6. The reading station as defined in claim 4, each guiding skid including at least two lifting prongs (20a) engaging the cassette for transmitting the same to and lifting the same from said opening means, said removing means, said inserting means and said closing means, said prongs being spaced from each other by a distance which is smaller than a length of the smallest cassette processed in the reading station.

7. The reading station as defined in claim 4, said positioning means moving said film platform below said opening means, said removing means, said inserting means and said closing means between an initial position and an end position, said film removing means and film inserting means including at least one sucker which removes the film from the cassette in its initial position and insert the erased film back into the cassette in its end position.

8. The reading station as defined in claim 7, further including an electronic control device and drive means for said positioning means, said guiding skids, said opening means, said removing means, said inserting means and said closing means, said drive means being connected to and controlled by said control device so that a correct and timely succession of function of said means be ensured.

9. The reading station as defined in claim 8, for the cassette including a digital memory or on the film of which is provided a digital memory, wherein a reading device is provided for reading out the memory on the cassette or on the film, said reading device being pivotable and being connected to said central memory and controllable by said control device and being pivotable to be positioned against said memory on the cassette or the film and back to an initial position after reading-out data on said memory.

10. The reading station as defined in claim 9, wherein said opening means, said removing means, said inserting means and said closing means may be formed as two similar groups of structural components, each group being assigned to a respective guiding skid and a respective transporting tape for the film removal from and the film insertion into said cassette.

* * * * *